Feb. 5, 1929.
O. C. SCHMIDT
1,701,455
ENDLESS CONVEYER
Filed Sept. 16, 1927
3 Sheets-Sheet 2
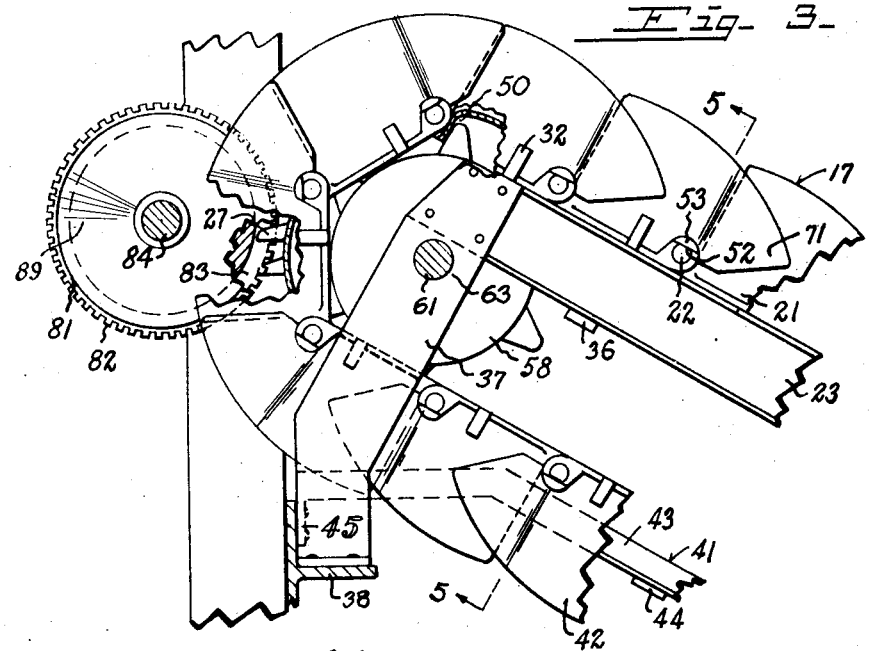
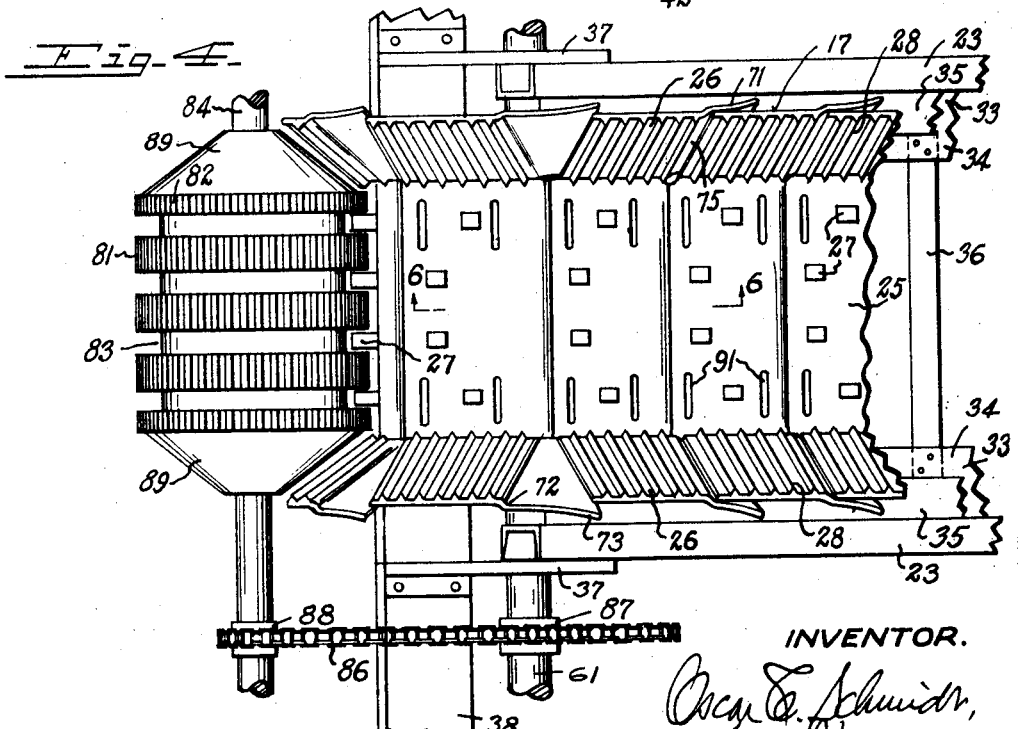
INVENTOR.

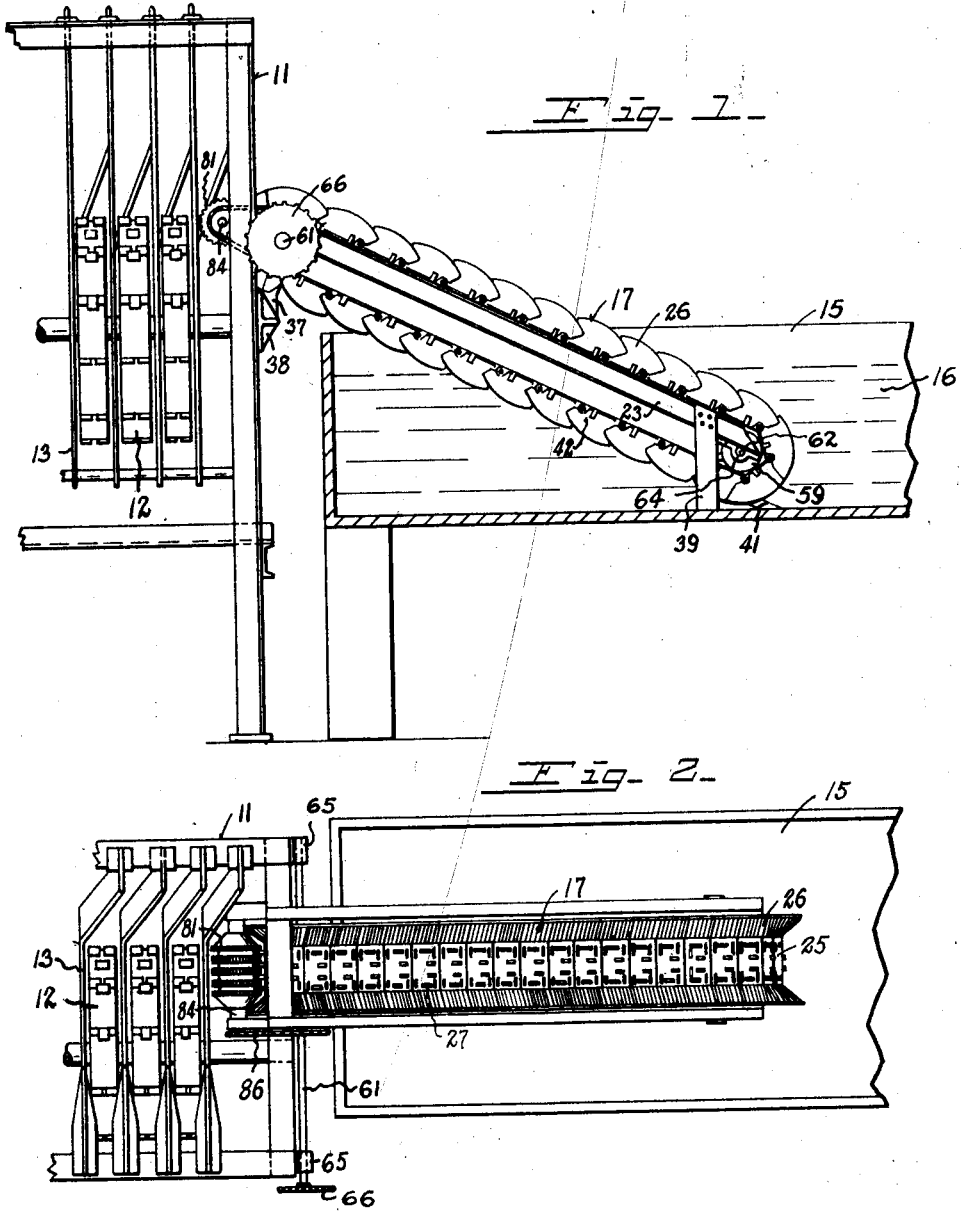

Feb. 5, 1929.
O. C. SCHMIDT
1,701,455
ENDLESS CONVEYER
Filed Sept. 16, 1927
3 Sheets-Sheet 3
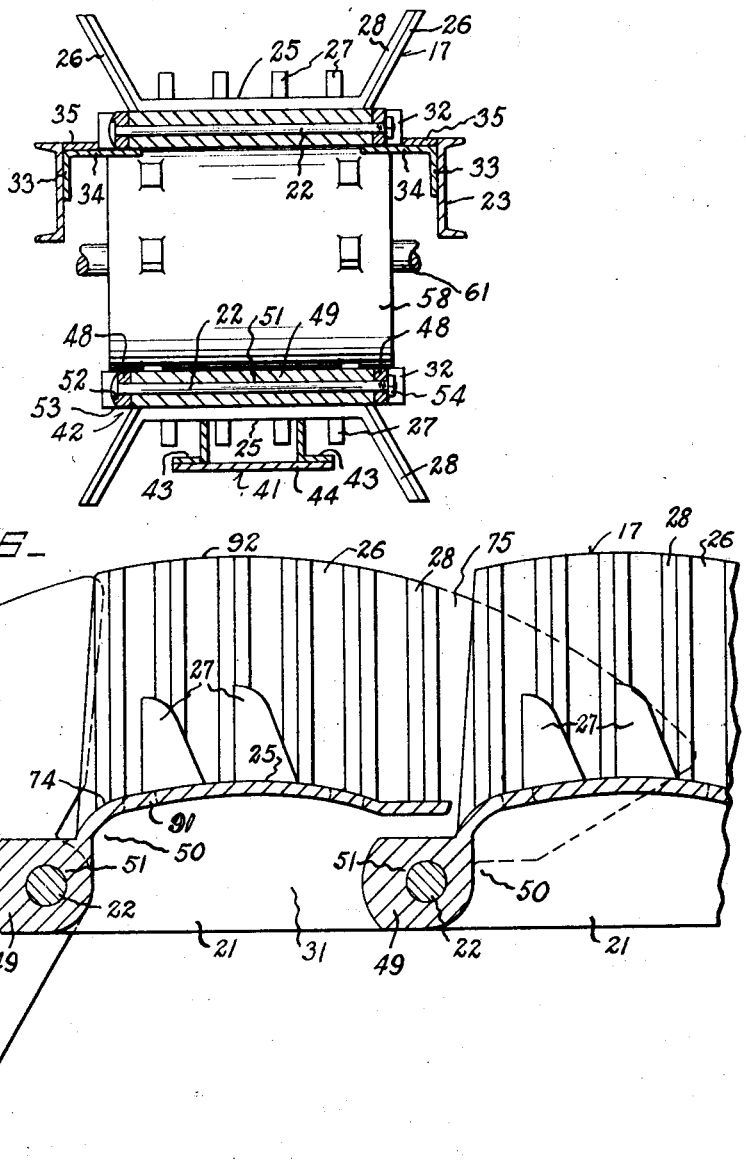
INVENTOR.

Patented Feb. 5, 1929.

1,701,455

UNITED STATES PATENT OFFICE.

OSCAR C. SCHMIDT, OF CINCINNATI, OHIO, ASSIGNOR TO THE CINCINNATI BUTCHERS' SUPPLY COMPANY, OF CINCINNATI, OHIO, A CORPORATION OF OHIO.

ENDLESS CONVEYER.

Application filed September 16, 1927. Serial No. 219,944.

My invention relates to endless conveyers, and is exemplified as employed in connection with a carcass dehairing machine, from which its use in other relations will be readily perceived. The hog carcass is instanced as the object being conveyed although it is obvious that the conveyer may be employed for conveying sacks, loose material, and other objects.

When the invention is employed in connection with hog dehairing machinery, it is particularly useful for conveying the hog carcasses endwise, for instance in conveying the hog carcasses from a scalding tank into the scraping machine.

It is the object of my invention to provide a conveyer of this character with links of novel construction; further, to provide such a conveyer with links having a bottom wall and upwardly outwardly slanting side walls, the said side walls having extensions arranged to overlap the side walls of proximate links in such manner that said side walls are substantially continuous, whether the conveyer is moving along a straight path or in a curved path about the direction wheel.

It is the object of my invention, further, to provide an endless conveyer of the character mentioned comprising links having upwardly and outwardly slanting side walls provided with end extensions which overlap proximate ends of the side walls of proximate links in order to avoid spaces between the ends of said side walls which might otherwise receive portions of the hog carcass whilst the conveyer travels about the direction-wheels at the ends of the loop thereof, and to thereby avoid pinching or injuring portions of the carcass or other object when the conveyer again assumes a straight path.

It is the object of my invention further to provide novel means for joining the links, and for supporting the links; further, to provide novel means whereby to insure travel of the object being conveyed by the conveyer; and, further, to provide novel releasing means at the end of the conveyer for releasing the carcasses or other objects from the conveyer.

The invention will be further readily understood from the following description and claims, and from the drawings, in which latter:

Fig. 1 is a side elevation of my improved device, shown in connection with a hog scraping machine and scalding tank, both of the latter partly broken away.

Fig. 2 is a plan view of the same, partly broken away.

Fig. 3 is an enlarged side elevation of my improved device, partly broken away.

Fig. 4 is a plan view of the same.

Fig. 5 is a cross-section of the same, taken on the line 5—5 of Fig. 3; and,

Fig. 6 is a cross-section of the same, taken on the line 6—6 of Fig. 4.

A hog dehairing machine for scraping hog carcasses is exemplified at 11, and comprises suitable rotatable scraping means 12, and is arranged for feeding hog carcasses lengthwise of the grate or trough 13 of the carcass dehairing machine. An exemplification of such machine is more fully shown and described in Letters Patent of the United States No. 1,388,899, granted on my application for Letters Patent on improvements in carcass dehairing and cleaning machine, and dated August 30, 1921.

A scalding tank 15 is arranged to contain a body 16 of scalding water, in which the carcass is scalded or conditioned for ready removal of the hair and scurf, and the scalded carcass is in practice passed through the dehairing machine for removing the hair or bristles and scurf from the carcass, and for cleaning the carcass, all as is well understood in the art.

The conveyer is an endless conveyer, and is shown generally at 17. It comprises links 21 having hinge pintles 22 therebetween, the links being connected and arranged loopwise lengthwise of a conveyer frame 23, slantingly arranged between the scalding tank and the dehairing machine, the upper end of the conveyer frame being attached to the dehairing machine and the lower end of the conveyer frame being supported on the bottom of the scalding tank. When a carcass has been properly scalded and is ready to be received by the dehairing machine, the carcass is floated upon the conveyer, the conveyer conveying the carcass into the dehairing machine.

Such carcasses are wet and slippery, and it is desirable to convey the same so as to enter the dehairing machine in endwise relation, and to maintain the carcass in such endwise relation, until it is being properly acted upon by the scraping means in the dehairing machine and being fed endwise in the dehairing machine.

In order to so properly feed and control the carcass, I provide the respective links of the conveyer with a bottom wall 25, and upwardly and outwardly slanting side walls 26, which are rigid with the bottom wall. The bottom wall is provided with feeding projections, shown as lugs 27, and the inner faces of the side walls are provided with feeding projections, shown as ribs 28, the lugs and ribs being pressed into the outer surface of the carcass by the weight of the carcass, without injury however to the carcass. The carcass is yielding, portions of the outer surface being received in the spaces between the lugs and ribs so that the lugs and ribs may have the proper hold upon the carcass for feeding the same. The side walls of the carcass also converge toward the bottom wall, the weight of the carcass causing the carcass to wedge between said slanting side walls to aid in the feeding movement of the carcass.

The respective links are provided with depending walls 31, which depend below the bottom wall 25. The depending walls are provided with guide lugs 32, respectively traveling on guideways of the conveyer frame.

The conveyer frame comprises side bars 33, provided with inwardly extending flanges 34, formed by angle bars secured to said side bars, guide strips 35 being secured to the upper faces of the angle bars. The lower edges of the depending walls and of the lugs 32 ride on the respective upper faces of the guide flanges 34, the links being guided laterally between the guide strips 35 at the respective sides of the links. The side bars 33 are connected by cross-braces 36. The upper end of the conveyer frame is provided with legs 37 fixed to the side bars and to a cross-bar 38 of the main frame of the dehairing machine. The conveyer frame is provided with legs 39 at its lower end which are supported on the bottom of the scalding tank.

A guide frame 41 for the return stretch 42 of the conveyer loop is provided. This guide frame comprises guide-bars 43, shown as angle bars, one of the wings of each of which is extended upwardly, so that the inner faces of the bottom walls 25 of the links, between the lugs 27 thereon, ride on the upper edges of said wings, for supporting said lower stretch in the return of the links to the bottom of the conveyer. These side bars are connected at suitable intervals by cross-braces 44. The upper end of the guide frame is provided with a flange 45, by means of which the guide frame is fixed to the cross-bar 38 of the frame of the dehairing machine. The lower end of the guide frame rests on the bottom of the scalding tank.

The depending walls are at one of the ends of the link provided with bearings 48. The other end of the link is provided with a bearing extension 49, which is received in a recess 50 between the depending walls of the next adjacent link. The bearing extension 49 is provided with bearings 51 which are received endwise between the bearings 48 of the next adjacent link.

The hinge-bolt 22 is received through the bearings 48, 51. The head of the bolt is provided with a flattened portion 52 which contacts a lug 53 extending from one of the bearings 48 for preventing turning of the bolt relatively to the bearings 48. A nut 54 is received over the threaded end of the bolt for holding the hinge-bolt in place. The bearing 51 is pivoted loosely about the hinge-bolt.

The endless conveyer is at the respective ends of its loop received about sprocket-wheels 58, 59, the teeth of which are received in the recesses 50 in the under faces of the links against the inner faces of the bearing extensions 49 for propelling the conveyer. The sprocket-wheels are respectively fixed to shafts 61, 62, journaled in bearings 63, 64, on the conveyer-frame. The shaft 61 may also be journaled in suitable bearings 65 on the frame of the dehairing machine. The shaft 61 is preferably the driving shaft of the conveyer, being driven in any suitable manner, as by a sprocket wheel 66, and the shaft 62 is preferably an idler shaft. The bearings 64 are preferably adjustable toward and from the bearings 63 in suitable manner.

The ribbed converging side walls of the conveyer links form substantially continuous side walls in the straight portion of the path of the endless conveyer while conveying the carcass from the scalding tank into the dehairing machine. When the links are received about the sprocket wheels at the ends of the conveyer frame, these ribbed portions of the side walls separate angularly lengthwise of the conveyer according to the angular relations of the links about the sprocket wheels. In order to avoid an interruption between the side walls of proximate links, one of the ends of the side walls of the respective links is provided with extensions 71, which are arranged to overlap the proximate ends of the side walls of proximate links, to close any space there might otherwise be lengthwise between said links while in a curved path about the sprocket wheels.

These extensions extend upwardly and outwardly with relation to the bottom wall of the link, and preferably extend downwardly below the plane of said bottom wall, and preferably extend beyond the proximate end of the proximate link when said proximate links are in extreme angular separation, for closing any side space there may be between said proximate links. These extensions preferably overlap the side walls of proximate links at the outer sides of said side walls, the said extensions being offset, as shown at 72, outwardly from the slanting side walls from which they extend, to form rabbets for the reception of the side walls of the proximate link. The outer ends of said extensions preferably flare outwardly as shown at 73, for ready reception of the ends of the side walls of the adjacent link when the links reassume a straight path.

The bearing extension 49 preferably fills the space between the hinge pintle 22 therein and the lower wall 25 of the link to which it is hinged, when the links travel about the drum, to prevent portions of the hog carcass being received between said bearing extension and said bottom wall when delivering the hog carcass to the dehairing machine.

The portion of the lower wall in rear of the bearing extension is raised or provided with a hump 74, to direct the carcass in upward direction away from the joint between links adjacent thereto, to aid in maintaining the carcass in non-interfering relation with the joints. The proximate ends of the ribbed portions of the side walls preferably have a space 75 between them when the proximate links are in a straight path to prevent pinching of portions of the carcass between said side walls.

The respective links are preferably formed as integral iron castings, providing a construction not readily subject to wear.

A releasing roller 81 is provided at the delivery end of the conveyer. The periphery of the releasing roller is provided with projections 82 shown as ribs, for making contact with the carcass as the carcass is received beyond the end of the conveyer. This roller is provided with peripheral grooves 83 in which the lugs 27 in the bottom of the conveyer are received. The roller 81 is secured to a shaft 84 journaled in bearings 85 on the frame of the dehairing machine at the entrance end of the dehairing machine, the roller being received between the side walls 26 of the conveyer, being provided with conical ends 89. The roller is rotated preferably at a greater peripheral speed than the speed of feed of the conveyer. It may be suitably driven by means of a sprocket chain 86 received about sprocket pulleys 87, 88, respectively fixed to the shaft 61 and to the shaft 84.

There is a tendency for the lugs 27 and the ribs 28 to be pressed into the carcass or other object being conveyed as, for instance, a sack containing grain or sand, without injury however to the carcass or other object being conveyed, but sufficiently to cause travel of the carcass or other object with the conveyer. The releasing roller 81 is provided in order to provide ready release of the carcass or other object from the lugs and ribs. This releasing roller exerts a pull upon the skin of the carcass or covering of the object being conveyed to stretch the skin or covering and pull it away from the lugs and ribs, and release the carcass or other object from the lugs and ribs or projections on the conveyer whilst the carcass or other object is passing from the conveyer. This releasing function is enhanced when the releasing roller rotates at a greater peripheral speed than the speed of travel of the conveyer, and takes place without injury to the skin of the carcass or covering of the other object.

The links of the conveyer are provided with openings 91, through which the scalding water passes for avoiding carrying of scalding water out of the range of the tank, and also for emptying the pockets in the rear faces of the links formed by the shapes of the bottom wall and depending walls of the links, such pockets being presented upwardly in the downward traveling stretch of the conveyer.

The upper edges of the side walls and extensions of the links are preferably arranged on a curve, shown at 92, described from the axis of the sprocket wheel about which the end of the loop of the conveyer is arranged. The side walls and their extensions form continuous side walls for said conveyer whilst the links are traveling about the drums, and whilst proximate links are at various angles between said relation and their relation whilst traveling in a straight path.

In my improved device the carcass is floated endwise on to the conveyer, which receives the carcass and automatically feeds it endwise and guides it laterally so that the carcass is automatically delivered endwise into the scraping machine, the lateral converging slanting walls traveling with the conveyer and hugging the carcass for feeding the same.

Having thus fully described my invention, what I claim as new, and desire to secure by Letters Patent, is:

1. In combination, an endless conveyer of the character described arranged loopwise and comprising chain links respectively having a bottom wall and depending walls depending from the respective sides of said bottom wall, one of the ends of the respective links provided with a bearing-extension overlapping the opposite ends of said side walls of the proximate link, and a hinge-pintle between said bearing-extension and said opposite end of said side walls of the proximate link, the said bottom wall provided with an upward bulge between its ends for raising the object being conveyed above the joint thus formed between proximate links.

2. In combination, an endless conveyer of the character described comprising chain links respectively having a bottom wall, side walls which diverge upwardly from said bottom wall, and depending walls depending from the sides of said link below said bottom wall, a hinge located below said bottom wall between proximate ends of said depending walls of proximate links, and a direction-wheel over which said conveyer is received loopwise, said links respectively comprising extensions extending above and below said bottom walls and overlapping said side walls of proximate links during travel of said links in a straight path and substantially closing the angular space between said side walls during travel thereof about said direction-wheel.

3. In combination, an endless conveyer of the character described, comprising chain links respectively having a bottom wall and side walls which diverge upwardly from said bottom wall, and depending walls depending from the sides of said link below said bottom wall, a hinge between proximate ends of said depending walls of proximate links, a direction-wheel over which said endless conveyer is received loopwise, and guideways at the sides of said links, said depending walls provided with lugs guided by said guideways, said links respectively comprising extensions, and said extensions offset with relation to said side walls for overlapping said side walls during travel of said links in a straight path and substantially closing the angular space between said side walls during travel thereof about said direction-wheel.

4. An endless conveyer of the character described comprising chain links respectively having a bottom wall and upwardly extending side walls, said bottom wall provided with spaced-apart upward projections for contact with the objects being conveyed, a conveyer frame along which said endless conveyer is arranged loopwise, and a supporting guide for the return stretch of said conveyer located under said conveyer frame, said supporting guide projected upwardly and received in the spaces between said projections and between said side walls, which projections and side walls project downwardly when in said return stretch.

5. A link for an endless conveyer of the character described comprising bearing means at the respective ends thereof for hinging proximate links together, a bottom wall having an upward bulge forming a cavity on the under side of said bottom wall, and side walls extending upwardly from said bottom wall, said bottom wall provided with feeding projections and with a draining opening for said cavity extending through said bottom wall.

In testimony whereof, I have hereunto signed my name.

OSCAR C. SCHMIDT.